April 19, 1960     H. H. WEBER     2,933,023
APPARATUS FOR MAKING GARMENT BAGS AND THE LIKE
Filed Feb. 8, 1957     8 Sheets-Sheet 1
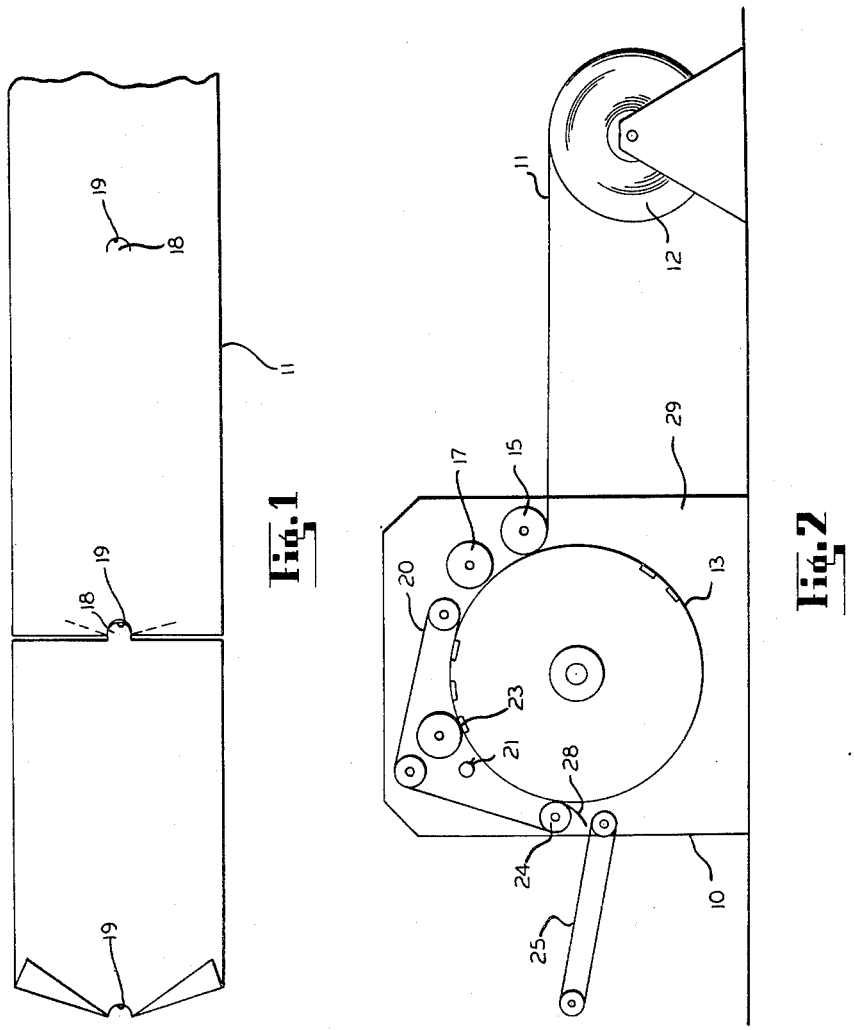
INVENTOR
HERBERT H. WEBER
BY
ATTORNEYS April 19, 1960  H. H. WEBER  2,933,023
APPARATUS FOR MAKING GARMENT BAGS AND THE LIKE
Filed Feb. 8, 1957  8 Sheets-Sheet 2
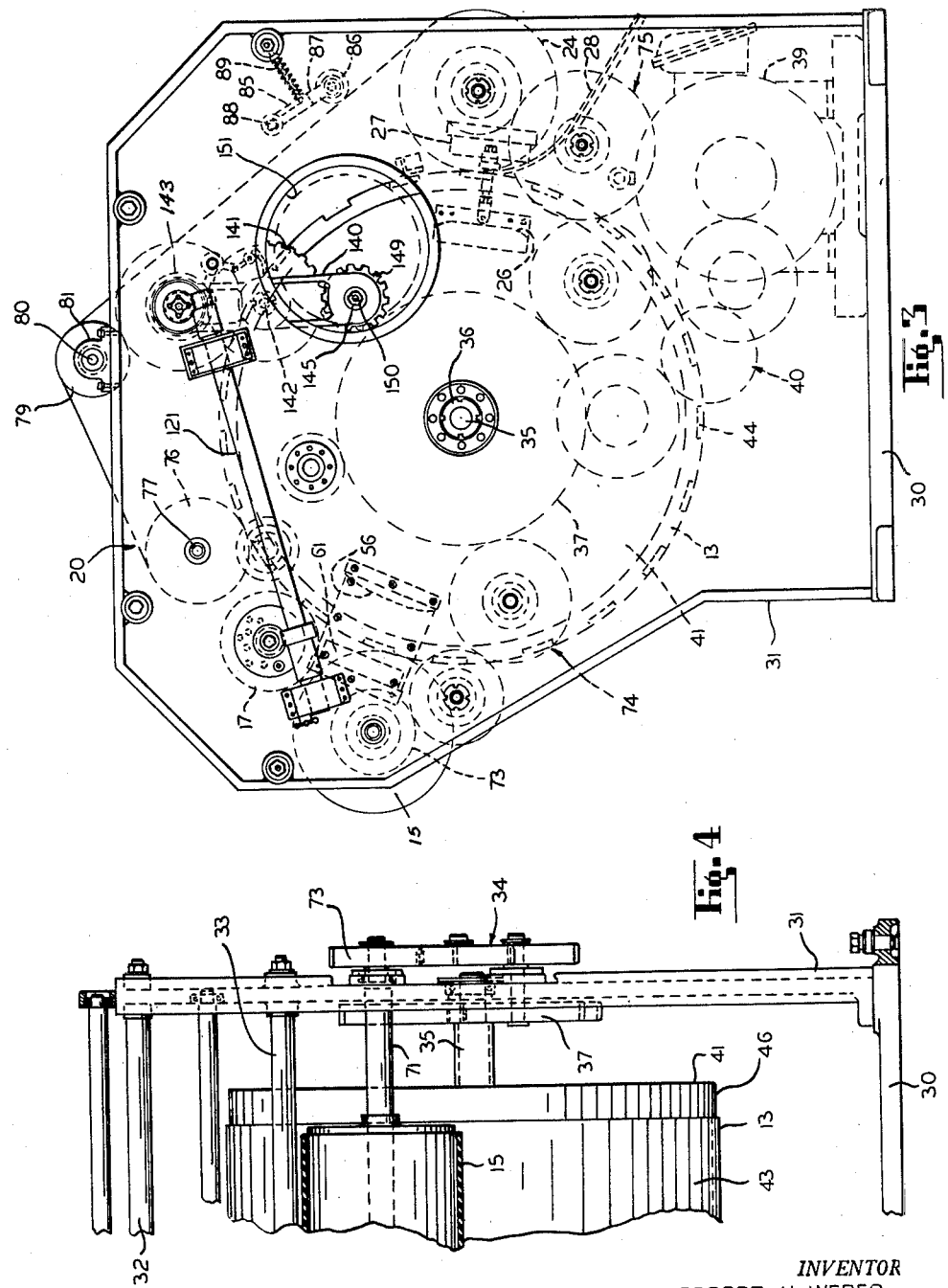
INVENTOR
HERBERT H. WEBER
BY
ATTORNEYS April 19, 1960   H. H. WEBER   2,933,023
APPARATUS FOR MAKING GARMENT BAGS AND THE LIKE
Filed Feb. 8, 1957   8 Sheets-Sheet 3
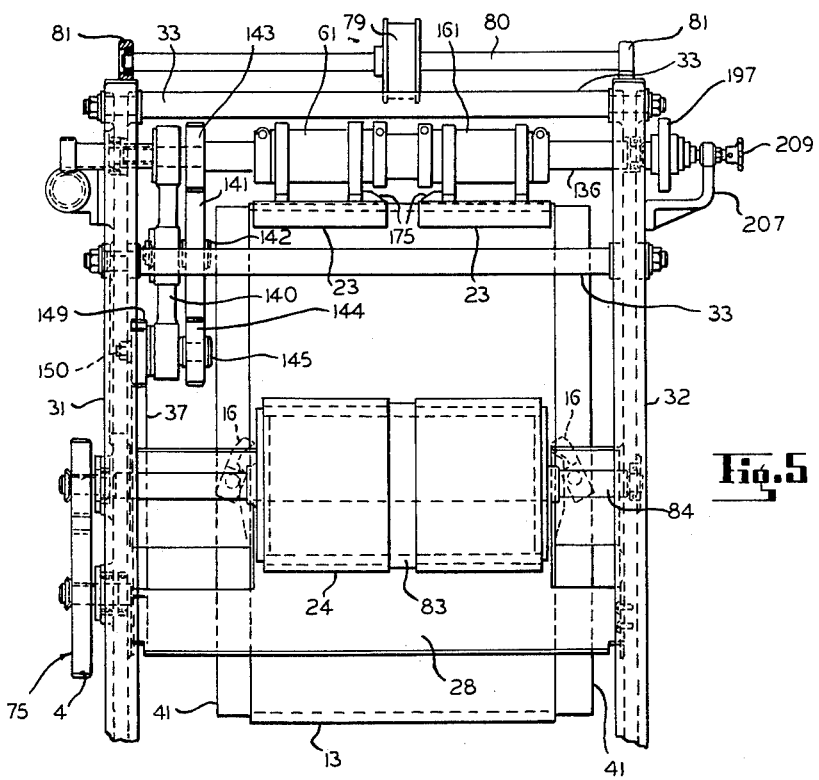
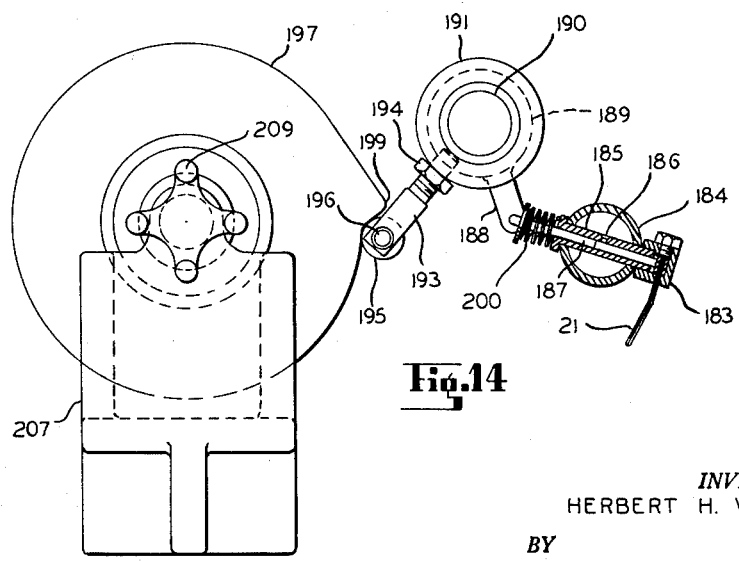
INVENTOR
HERBERT H. WEBER
BY
Hill, Sherman, Meroni, Gross & Simpson
ATTORNEYS

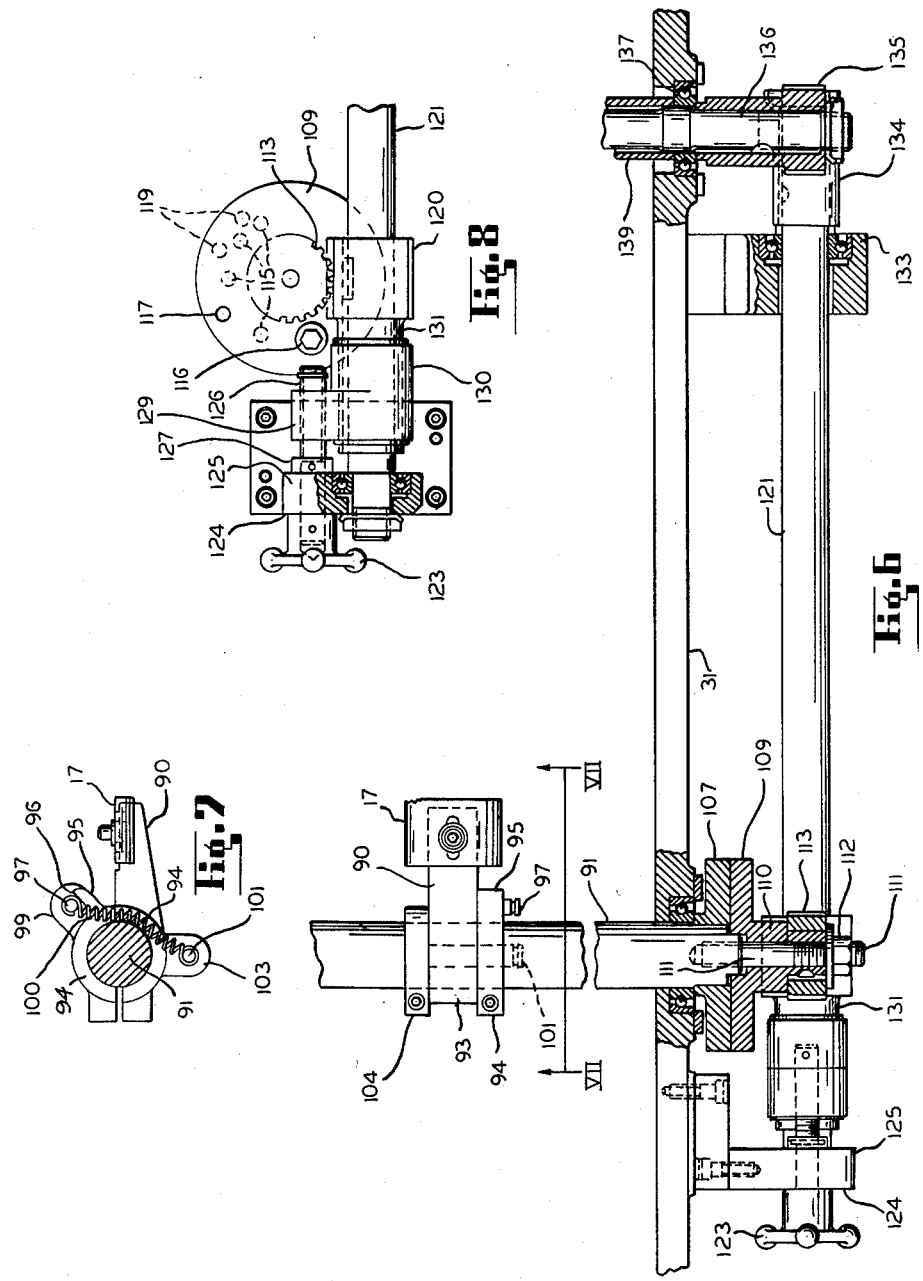

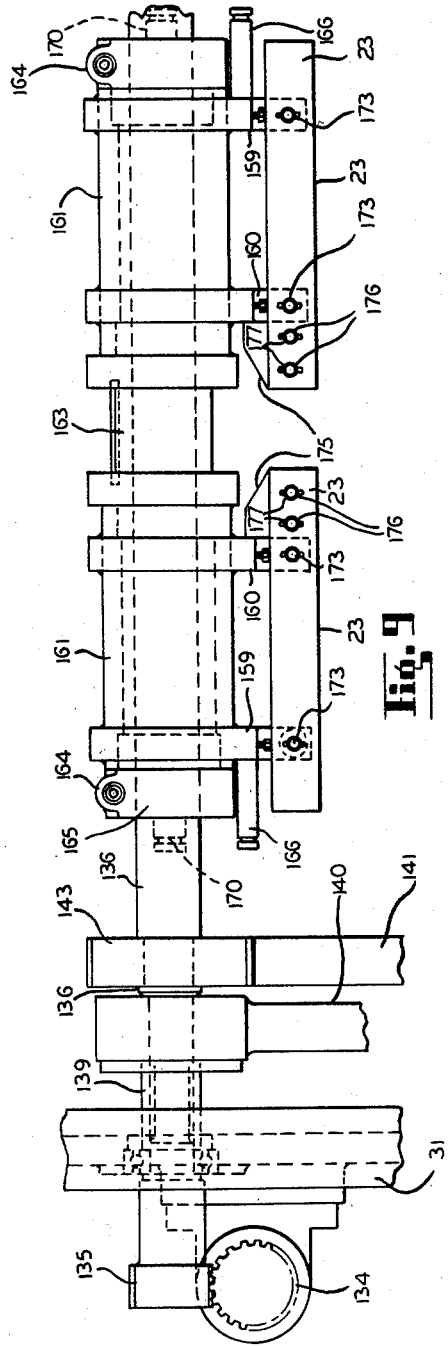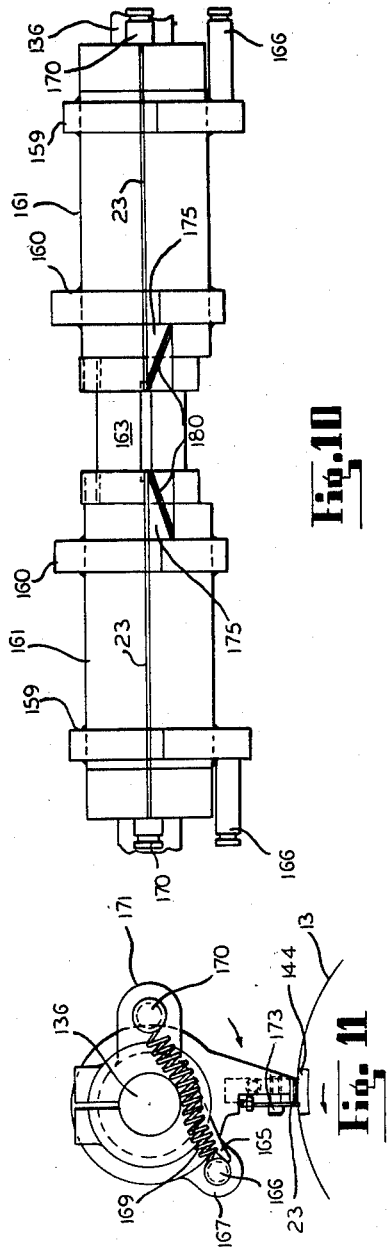

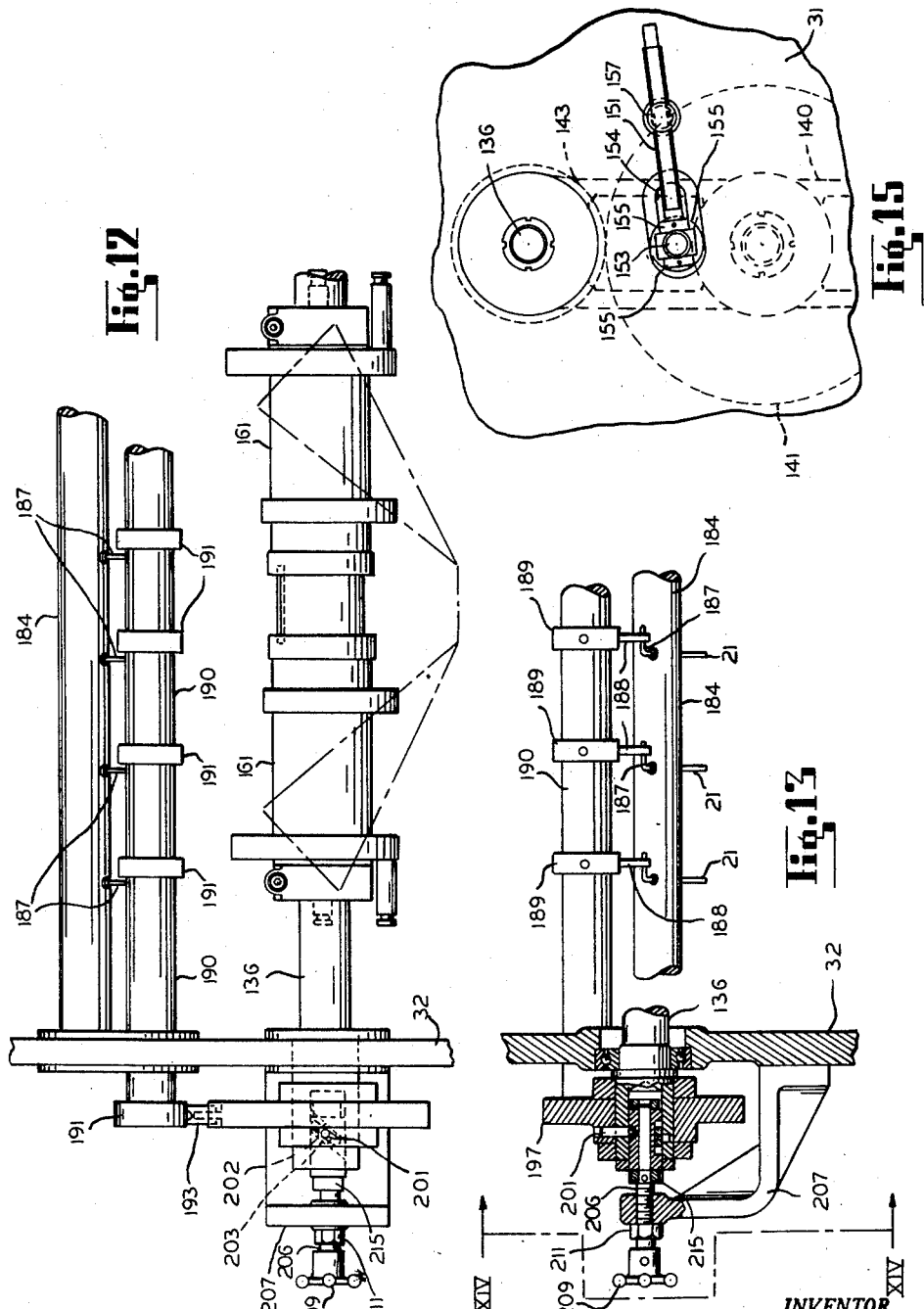

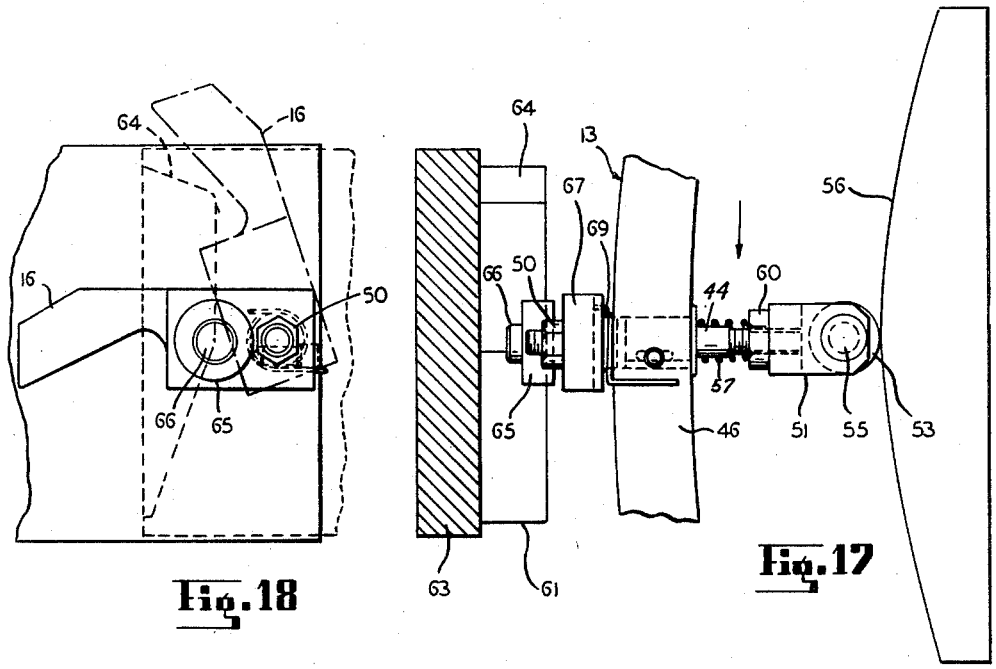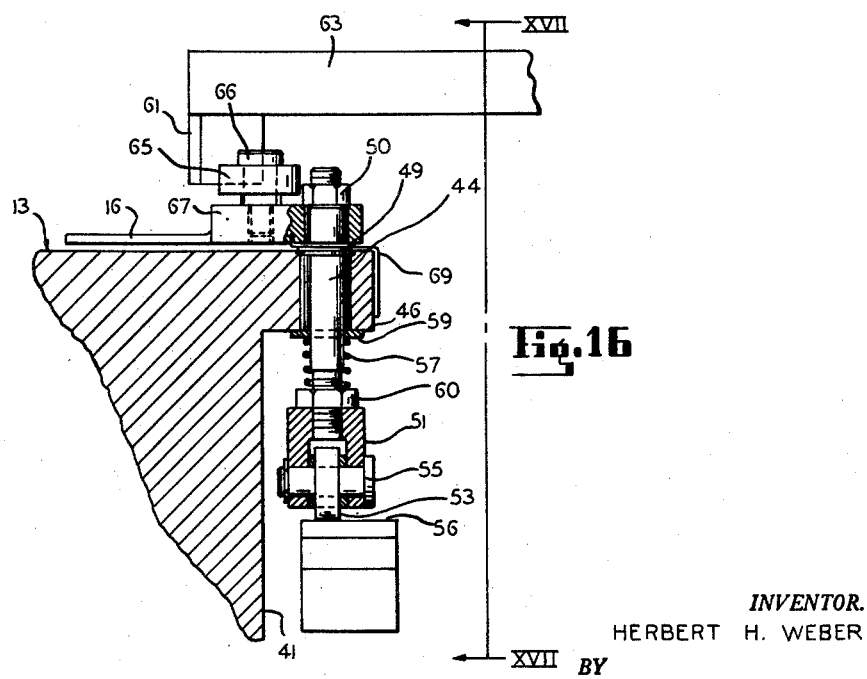

April 19, 1960 H. H. WEBER 2,933,023
APPARATUS FOR MAKING GARMENT BAGS AND THE LIKE
Filed Feb. 8, 1957 8 Sheets-Sheet 8

INVENTOR
HERBERT W. WEBER
BY
Hill, Sherman, Meroni, Gross & Simpson
ATTORNEYS

United States Patent Office 2,933,023
Patented Apr. 19, 1960

2,933,023

APPARATUS FOR MAKING GARMENT BAGS AND THE LIKE

Herbert H. Weber, Sheboygan, Wis., assignor to H. G. Weber and Company, Inc., Kiel, Wis., a corporation of Wisconsin Application February 8, 1957, Serial No. 639,022

12 Claims. (Cl. 93—8)

This invention relates to an improved apparatus for making garment bags and the like.

A principal object of the invention is to provide a novel and improved apparatus for making garment bags and the like in a simpler and more expeditious manner than formerly.

A further object of the invention is to provide an improved apparatus for making garment bags and the like in which various lengths of bags may be made on the same machine, and in which the lengths of the bags may be varied by varying the angular relation of the cutting knives with respect to each other and by varying the speeds of the cutting knives with respect to a traveling surface carrying the bag and traveling at a constant speed.

A still further object of the invention is to provide a garment making machine forming the bag from a flattened tube by a series of slitting, creasing and folding operations in which the drive to the slitting knives is slower than the speed of travel of the bag and is yieldable to accommodate a traveling reaction surface carrying the bag to bring the knife up to the speed of travel thereof, during a slitting operation.

A still further object of the invention is to provide a garment bag making machine including a rotating drum having resilient strips extending across the face thereof at regular intervals, spaced in accordance with increments in length of the completed garment bags, and in which the bag is formed from a flat tube by a series of slitting and cutting knives reacting against resilient strips on the drum, and accelerated thereby during the slitting operation to the speed of travel of the drum.

A still further object of the invention is to provide a simplified and improved garment bag making machine in which the lengths of the garment bags may be selected at the selection of the operator of the machine, and in which a novel and simple arrangement is provided for varying the lengths of the bags.

These and other objects of the invention will appear from time to time as the following specification proceeds and with reference to the accompanying drawings wherein:

Figure 1 is a diagrammatic plan view of a flat tubular strip of paper showing the steps in making a completed garment bag;

Figure 2 is a schematic diagrammatic view, diagrammatically illustrating a garment bag making machine constructed in accordance with the invention;

Figure 3 is a side elevational view looking at the garment bag making machine from one side thereof;

Figure 4 is a fragmentary end view of the machine looking at the entering end of the machine, with certain parts of the machine broken away and certain other parts shown in vertical section;

Figure 5 is an end view of the machine looking at the machine at the discharge end thereof;

Figure 6 is a fragmentary plan view with certain parts broken away and certain other parts shown in horizontal section, and showing the drive to the slitting knives of the machine;

Figure 7 is a vertical sectional view taken substantially along line VII—VII of Figure 6;

Figure 8 is a fragmentary side elevational view with certain parts shown in horizontal section in order to illustrate the adjustment means for adjusting the angular relation of one slitting knife with respect to the other;

Figure 9 is a fragmentary end view of the machine illustrating the slitting knives and creasing devices and the drive therefor;

Figure 10 is a bottom plan view of the slitting knives and creasing devices shown in Figure 9;

Figure 11 is a transverse sectional view showing the drive to one of the slitting knives and showing the knife in engagement with the traveling paper carrying drum during a slitting operation;

Figure 12 is a fragmentary plan view of the machine, illustrating the glue spotters and the drive thereto, and the relationship between the glue spotters and the slitting knives;

Figure 13 is a fragmentary sectional view taken substantially along line XIII—XIII of Figure 12;

Figure 14 is a view looking at the machine substantially along line XIV—XIV of Figure 13, and illustrating the cam and drive therefrom to the glue spotters, spotting the partially finished garment bag with glue prior to the final slitting operation thereof;

Figure 15 is an enlarged partial fragmentary view in side elevation of the machine looking at the same side thereof as in Figure 3, and illustrating the adjustable bearing support for the gearing for driving the slitting knives and accommodating the speed thereof to be readily changed;

Figure 16 is a fragmentary sectional view taken through an end of the carrying drum for the garment bag, illustrating one of the hold-down fingers for the edges of the bag and the means for bringing the same to hold down the edges of the bag;

Figure 17 is a fragmentary end view looking toward the drum substantially along line XVII—XVII of Figure 16;

Figure 18 is an enlarged detail plan view illustrating one of the hold-down figures and operating cam therefor, for moving the finger away from the garment bag at the termination of a forming operation thereof;

Figure 19:
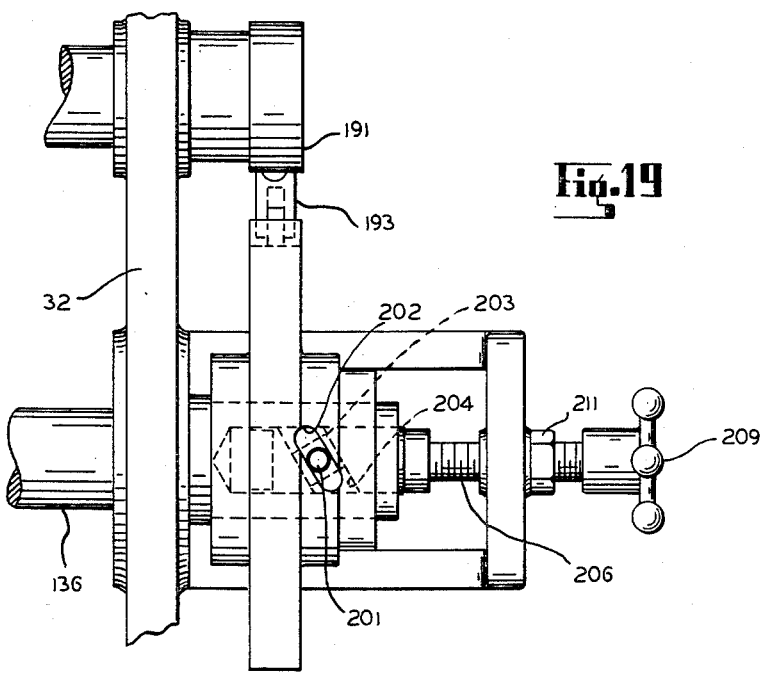
Figure 19 is an enlarged fragmentary plan view illustrating the adjustment means for the glue spotter cam.
Figure 20:
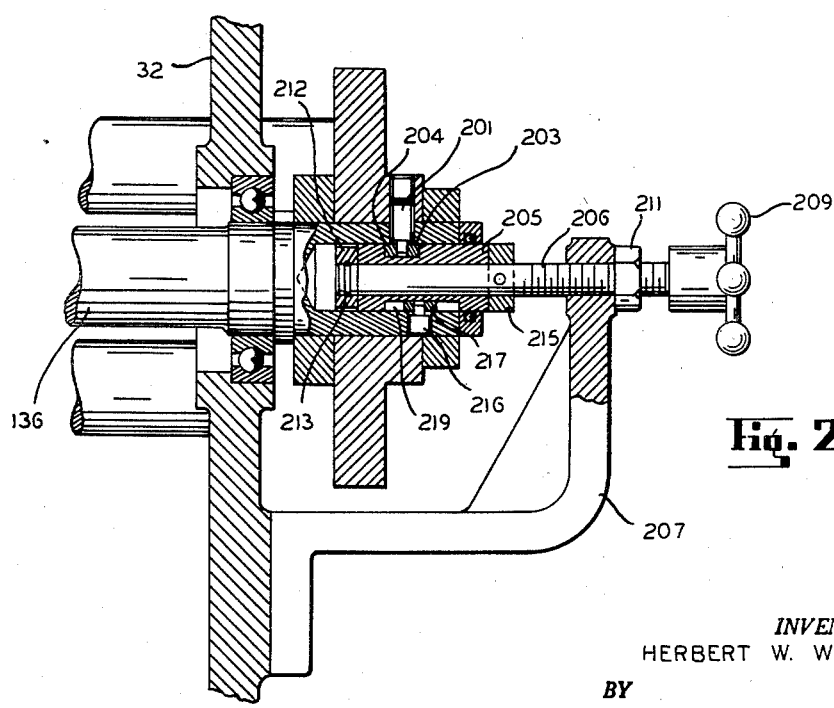
Figure 20 is a fragmentary vertical sectional view taken through the cam and adjustment means therefor shown in Figure 19.

In the embodiment of the invention illustrated in the drawings, we have shown in Figures 1 and 2 the steps of making a garment bag in accordance with our invention and diagrammatically show a garment bag making machine 10, drawing a flattened tube of fabric or paper 11 from a storage reel 12 onto a traveling working surface in the form of a rotatably driven drum 13. The flattened tube 11 is drawn onto the drum 13 by means of a draw roll 15 and is retained thereto by retaining fingers 16 pivotally mounted on opposite sides of the drum and movable into engagement with the edges of the tube as the tube is drawn onto the drum, and movable out of the way of the edges of the tube at the completion of the garment forming operation (see Figures 16, 17 and 18), as will hereinafter be more clearly described as the specification proceeds.

As the tube 11 is drawn to the drum by the draw roll 15 and retained thereto by the retaining fingers 16, it first passes under a lip cutter 17, first cutting an arcuate slit 19 along the leading edge of the tube and along the longitudinal center thereof, and then cutting uniformly spaced arcuate slits 19 in the center of the tube at regularly spaced intervals.

The tube is then retained to the drum by a traveling belt 20 extending along the central portion of the drum and of a width slightly narrower than the width of the arcuate slit 19.

The tube then passes under a slitting cutter 23 and creaser secured thereto, transversely cutting the tube along opposite sides of the arcuate slit portion 19 thereof and creasing the tube at angles extending rearwardly from the advance opposite edges of the slit or recessed portion 19 of the tube, causing the advance edge of the tube to turn upwardly on opposite sides of the slit portion thereof.

The severed and creased tube then passes under glue spotters 21 extending across the top of the drum. The glue spotters 21 are spaced transversely of the drum to spot the top surface of the tube with glue just behind the creased portions thereof.

The severed tube spotted with glue is then carried under a folding drum 24 by the belt 20, which folds the upstanding leading edge thereof backward onto the glue spotted portion of the tube, and delivers the tube in the form of a completed garment bag onto a stacking conveyor 25. Prior to the folding operation, the retaining fingers 16 are moved out of the way of the completed bag by cams 26 and 27 on a frame 29 for the machine, as will hereinafter more clearly appear as the specification proceeds.

With the machine and process just described, 200 completed garment bags 30" in length may be produced in one minute's time and the lengths thereof may be increased in 6" increments up to 72", as will hereinafter be more clearly described as this specification proceeds.

It should here be understood, however, that as the length of the garment bag is increased, that the number of garment bags produced per minute correspondingly decreases, due to the decrease in speed of the cutters necessary to attain the longer garment bags traveling on the drum 13 rotating at a constant speed.

Referring now in particular to Figures 3, 4 and 5, and the garment bag making machine in particular, the machine is shown as comprising a base 30 having parallel spaced side frame members 31 and 32 secured thereto and extending upwardly therefrom. The side frame members 31 and 32 are shown as being connected together by tie rods 33 spacing said side frame members apart in parallel relation with respect to each other and maintaining said side frame members in such relation. The drum 13 is rotatably mounted on the side frame members 31 and 32 on a transverse shaft 35, journaled in said frame members on bearings 36. A spur gear 37 is keyed or otherwise secured to the transverse shaft 35 and is driven from a motor 39 through a spur gear train 40.

The drum 13 is shown as having opposite end walls 41 connected together by a cylindrical surface 43 having yieldable inserts 44 embedded therein and extending thereacross. The inserts 44 are spaced along the surface of the drum at regular intervals in accordance with increments in increase in length of the garment bags that may be made, in lengths from 30" in length to 72" in length, in increments of 6". The yieldable inserts 44 may accordingly be spaced along the surface of the drum 13, 6" apart. These inserts may be made from rubber or from one of the well known substitutes for rubber, and form reacting surfaces against which the cutters 17 and 23 act during slitting and transverse cutting of the flattened tube, to cut both sides of the flattened paper tube 11 to form a completed garment bag.

Adjacent opposite outer ends of each insert and spaced around the drum 13 at intervals of 6" apart, are the retainer fingers 16, shown in detail in Figures 16, 17 and 18. Only two of said fingers are shown in Figure 5 in order to simplify the illustration of the invention. As herein shown, the retainer fingers 16 are secured to the upper end portions of radially extending shafts 45 pivotally mounted in opposite rims 46 of the drum 13. The retainer fingers 16 are each of the same construction, so one only need herein be described in detail.

The finger 16 is retained in abutting engagement with a collar 49 on the shaft 44 as by a nut 50 threaded on the outer end of said shaft. The shaft 45 has a yoke 51 on its lower end having a roller 53 mounted between the furcations thereof on a pin 55. The roller 53 forms a follower riding along a cam 56 at the entering end of the machine to pivot the finger 16 outwardly with respect to the surface of the drum 13 to accommodate the tube 11 to pass therebeneath. The roller 53 is biased into engagement with the cam 56 by a compression spring 57 encircling the shaft 45 and interposed between a washer 59 engaging the underside of the rim 46 and a lock nut 60 threaded on said shaft and locking the yoke 51 in position thereon. The roller 53 also engages the cam 26 at the discharge end of the machine for raising the associated retaining finger 16 and accommodating the release of the completed garment bag from the rotating drum 13.

Each finger 16 is also pivotally moved about the axis of the shaft 45 toward the outside of the drum as it is raised by the associated cam 56 or by 26, by cams 61 and 27, as the drum 13 rotates in a clockwise direction, as shown in Figure 3 to rapidly move the retainer fingers 16 backwardly out of the way of the incoming bag at the entering end of the machine, and to rapidly move said retainer fingers out of the way of the completed bag at the discharge end of the machine.

The cams 61 and 27 are each mounted on the side frame members 31 and 32 and are each of the same construction, so the cam 61 only need herein be shown and described in detail. The cams 61 extend radially inwardly from brackets 63 mounted on the insides of the side frame members 31 and 32. Each cam 61 has an inclined cam surface 64 engaging a roller 65 on a pin 66 mounted on and projecting upwardly from a thickened portion 67 of the finger 16 as the drum 13 rotates with respect thereto. The cam surface 64 slopes at a rather steep angle so that relative movement between the drum 11 and cam 61 will effect engagement of the successive rollers 65 with the cam surface 64 and rapidly pivot the fingers 16 backwardly out of the way of the paper tube 11 on the drum 13 at the entering and discharge ends of the machine. A torsion spring 69 mounted on the shaft 44 and having engagement with the rim 46 at one leg thereof and with the retaining finger 16 at the opposite end thereof is provided to bias said finger in the extended position shown by solid lines in Figures 16 and 18.

The draw roll 15 is shown in Figure 4 as being rubber covered and as being mounted on a transverse shaft 71 journaled in the side frame members 31 and 32. A gear 73 is keyed or otherwise secured to the end of the shaft 71, which projects beyond the side frame member 31, and is driven from the gear 37 at the peripheral speed of the drum 13 through a step-up gear train 74. The point of engagement of the draw roll 15 with the surface of the drum 13 is shown in Figure 3 as being at the entering end of the cams 56 to assure that the retainer fingers 16 are out of the way of the flattened tube of paper 11 as it is drawn onto the drum 13.

The traveling belt 20, for retaining the tube to the periphery of the drum 13 from the lip cutter 17 to the folding roll 24 is slightly narrower than the slit 19 and is shown as being trained about a flanged pulley 76 on a transverse shaft 77 journaled in the side frame members 31 and 32 and positioned adjacent the discharge end of the lip cutter 17. From the pulley 76 the belt 20 is trained about an idler 79 on a transverse shaft 80, journaled in bearing boxes 81 mounted on the top of the side frame members 31 and 32. The belt 20 then extends downwardly and around a central grooved portion 83 of the folding roll 24 (see Figs. 3 and 5). From thence the belt is trained about the periphery of the drum 13 to the pulley 76, it being understood that the folding roll 24 is driven in an opposite direction from the direction of rotation of the drum 13 to cause the belt 20 to retain the flat paper tube 11 to the surface of the drum 13 from the lip cutter 17 to the folding drum 24.

A belt tightener 85 is provided to maintain tension on the belt 20. The belt tightener 85 is herein shown as comprising a roller 86 mounted on one end of a pivoted arm 87, pivoted between the side frame members 31 and 32 on a pivot shaft 88. A spring 89 biases the roller 86 into engagement with the belt 20 to maintain the required tension thereon.

The folding roll 24 is mounted on a transverse shaft 84 journaled in opposite side frame members 31 and 32 and is driven from the gear 37 through a gear train 75, driving the folding drum 24 at the peripheral speed of the drum 13 and also driving the belt 20 at the peripheral speed of said drum.

A chute 28 is mounted between the side frame members 31 and 32 and extends from the nip between the folding drum 24 and the periphery of the drum 13 to carry the completed garment bag from said folding drum onto the stacking conveyor 25.

Referring now in particular to Figures 6, 7 and 8, and the lip cutter 17, said lip cutter has an arcuate cutting face shaped to cut an arcuate slit in both sides of the flattened tube 11, with the concave portion thereof facing in the direction of travel of the tube and is mounted on the outer end of an arm 90, freely mounted on a transverse shaft 91, journaled in the side plates 31 and 32 (see Figure 6). The lip cutter 17 is adapted to cut against an insert 44 during each cutting operation to cut an arcuate slit 19 in both sides of the traveling paper tube 11 in the longitudinal center thereof. The lip cutter 17 is rotatably driven at a slower rate of speed than the speed of travel of the drum 13, and is accelerated by a strip 44 during the cutting operation, to cut at the speed of travel of the drum 13. As herein shown, the arm 90 extends from a hub 93 freely mounted on the shaft 91.

A split drive collar 94 is secured to the shaft 91 to one side of the hub 93 and has a drive lug 95 projecting therefrom and having a radial face 96 engaging a pin 97 projecting outwardly from an ear 99 extending radially from the hub 93. The pin 97 is maintained in engagement with the radial face 96 of the drive lug 95 by a tension spring 100 connected to the pin 97 at one end and to a pin 101 at its opposite end. The pin 101 projects outwardly from an ear 103 extending radially from the drive collar 94. The lip cutter 17 is maintained in position on the shaft 91 by a split collar 104 engaging the opposite side of the hub 93 from the collar 94.

As has previously been mentioned, the lip cutter 17 is rotatably driven at a slower peripheral speed than the peripheral speed of the drum 13. Thus, as the lip cutter 17 comes into engagement with the flat tube of paper from which the garment bag is to be formed, the cutter 17 will slit both sides of the tube in cooperation with a resilient insert 44. Engagement of the cutter 17 with the insert 44 will accelerate the speed of the cutter 17 to the peripheral speed of the drum 13 and cause the pin 97 to move away from the drive lug 96 against the compression spring 100. As soon, however, as the lip cutter 17 leaves the insert 44, the spring 100 will draw the pin 97 back into engagement with the face 96 of the drive lug 95. This will withdraw the cutter from the flat tube and pick up flaps 18 from the top and bottom surfaces of the flat tube.

The shaft 91 is shown in Figure 6 as extending outwardly of the side frame member 31 and as being journaled in said side frame member and having a disk 107 keyed or otherwise secured to its outer end. The disk 107 is abutted at its outer face by a disk 109 having a hub 110 projecting outwardly therefrom. A threaded pin 111 is threaded within the end of the shaft 91 and extends outwardly therefrom through the hub 110 of the disk 109. A nut and washer 112 are provided to maintain a helical drive gear 113 on the hub 110 to drive said hub. The disk 107 is provided with a plurality of circumferentially spaced threaded holes 115, therein adapted to be engaged by a cap or machine screw 116 extending through a corresponding hole in the disk 109 for adjusting the angular relation of the lip cutter 17 with respect to the cut-off cutters 23. The disk 109 is also provided with a hole 117 leading therethrough, spaced radially outwardly from the cap screw 116 and adapted to register with either of two threaded holes 119 provided in the disk 107, to afford an additional adjustment of the angular relation of the lip cutter 117 with respect to the cutters 23.

As for example, when the machine screw 116 is located in the position shown in Figure 8, the angular relation of the lip cutter 17 to the cutters 23 is such that a 30" bag may be formed, provided the cutters 17 and 23 are rotating in the proper timed relation with respect to the peripheral speed of the drum 13. When the cap screw 116 is in registry with either one of the next succeeding holes 115, the angular relationship of the cutters 17 and 23 will be such as to form bags 36, 48, 60 and 72" in length, respectively. When the cap screw 116 is in registry with the hole 117 and either of the first or second holes 119 in the disk 107, the angular relationship of the cutters 17 and 23 will be such as to cut a bag 54" in length, when the hole 117 is in registry with the next adjacent hole 119, and to a cut a 66" bag when the hole 117 is in registry with the farthest hole 119.

The helical gear 113 meshes with and is driven from a helical gear 120, which may be feather keyed to a longitudinally extending drive shaft 121 for limited adjustable movement therealong, to enable the holes in the disks 107 and 109 to be accurately aligned with each other, a hand wheel 123 is provided to axially move the shaft 121 and gear 120. Said hand wheel abuts an outer face 124 of a bracket 125, secured to and extending outwardly from an outer side frame member 31, and is pinned or otherwise secured to a threaded shaft 126 rotatably carried in the bracket 125 and extending in advance thereof. A collar 127 abuts the opposite side of the bracket 125 from the hand wheel 123 and is pinned or otherwise secured to a threaded shaft 126 to prevent axial movement of said shaft with respect to said bracket. The shaft 126 is shown as being threaded within a lug 129 extending outwardly from a sleeve 130 freely mounted on the shaft 121 and extending over the hub 131 of the helical gear 120 and having interengagement with said sleeve, to move the helical gear 120 along the shaft 121 upon turning movement of the wheel 123, and thus to angularly move the helical gear 113 and disk 109 with respect to the disk 107.

The shaft 121 is journaled at one end in the bracket 125 and extends along the outside of the side frame member 31 and is journaled inwardly of its opposite end in a bearing bracket 133 extending outwardly from the side frame member 31. A helical gear 134 is shown as being keyed or otherwise secured to the outer end thereof. The helical gear 134 meshes with a helical gear 135, keyed or otherwise secured to the outer end of a transverse drive shaft 136 for the shearing cutters 23.

Thte shaft 136 is journaled adjacent the helical gear 135 and the side frame member 31 in a bearing 137, and has a spacer sleeve 139 extending inwardly from the bearing 137 to an arm 140, journaled on the shaft 136 for adjustable movement with respect thereto. The arm 140 has a gear 141 mounted thereon intermediate the ends of said arm on a stub shaft 142 suitably journaled in said arm. The gear 141 meshes with and drives a spur gear 143 keyed, or otherwise secured to the shaft 136. The spur gear 141 is driven from a spur gear 144, mounted on the inner end of the arm 140 on a shaft 145, journaled in said arm and extending outwardly therefrom and keyed or otherwise secured to the shaft 145. The opposite end portion of the shaft 145 from the spur gear 144 has a spur gear 149 keyed or otherwise secured thereto and meshing with and driven from the spur gear 37 on the drum drive shaft 36. A nut and washer 150 threaded on the outer end of the shaft 145 is provided to detachably retain the spur gear 149 to said shaft.

It will here be noted that the side frame member 31 is provided with a circular opening 151 affording access to the nut and washer 150 and accommodating the gear 149 to be removed from the shaft 145 and to be replaced by a different gear having a different number of teeth, to change the peripheral speeds of the cutters 17 and 23 with respect to the peripheral speed of the face of the drum 13. Thus, each time the angular relationship between the cutters 17 and 23 is varied, to vary the length of the bag to be cut, the speed of rotation of the cutters 17 and 23 may be varied by interchanging the gear 149 with a gear having a different number of teeth to correlate the peripheral speeds of the cutters 17 and 23 with the peripheral speed of the drum 13 and assure that the cutters register with the yieldable inserts 44 during each cutting operation for each length of bag cut. The arm 140 is adjustably moved about the axis of the shaft 136 and maintained in a fixed position, to enable gears of different pitch diameters to be substituted for the gear 149, and to thereby change the speed of the shaft 136, by means of an adjusting screw 152 (see Figure 15). The adjusting screw 152 is rotatably mounted in a pin 153 extending along the outside of the side frame member 31. The pin 153 extends outwardly from the arm 140 intermediate the ends thereof through an arcuate slot 154 in the side frame member 31. Collars 155 are pinned or otherwise secured to the adjusting screw 152 on opposite sides of the pin 153 to retain said adjusting screw to said pin. The adjusting screw 152 is threaded within and extends through a lug 157 pivotally carried in the side frame member 31 and extending outwardly therefrom. Thus, upon rotatable movement of the adjusting screw 152, the arm 140 may be pivoted about the axis of the shaft 136 to vary the spacing between the lower end of said arm and the spur gear 37 and accommodate the substitution of gears of different pitch diameters for the spur gear 159, to change the speed ratio of the drive to the cutters 17 and 23.

The cutters 23 extend laterally from opposite sides of the endless conveyor 20 and are mounted on spaced arms 159 and 160 extending outwardly from opposite ends of drums 161 freely mounted on the shaft 136. The drums 161 abut a spacer collar 163 at their inner ends spacing the drums 161 apart and suitably secured to said drums to rotate said drums together. Drive collars 164 abut the outer ends of the drums 161 and are rotatably driven by the shaft 136. The drive from the drive collars 164 to the cutters 23 is similar to the drive from the drive collar 94 to the arm 93 and cutter 17. A drive lug 165 projecting tangentially from each drive collar 164 has driving engagement with a pin 166 extending outwardly from a radial lug 167 extending from the arm 159. The pin 166 extends axially of the shaft 136 in parallel relation with respect to the axis thereof and is maintained in engagement with the face of the drive lug 165 by a tension spring 169. The tension springs 169 are connected between the pins 170 and the pins 166, and bias the pins 166 into engagement with the drive lugs 165 and accommodate the cutters 23 to increase their peripheral speeds to the peripheral speed of the drum 13 when engaging a respective resilient insert 44 therein during a transverse slitting operation of the tube 11.

The cutters 23 are shown in Figures 9 and 10 as being in the form of knives adjustably secured to the arms 159 and 160 as by nuts and bolts 173.

Each cutter 23 is herein shown as having a creaser blade 175 secured to the inner end thereof and extending angularly outwardly from the inner ends of the cutters 23 in a direction opposite to the direction of rotation of the cutters 23. Each creaser blade 175 is shown as being adjustably secured to the rear or retreating face of a cutter 23, inwardly of the arm 160 as by nuts and bolts 176, the bolts of which extend through slotted portions 177 of the cutters 23, to accommodate adjustment of the creaser blades 175 with respect to said cutters. Each creaser blade 175 has an angular creasing surface 180, extending angularly rearwardly and outwardly from the inner end of each cutter 23, to crease the top and bottom faces of the flattened paper tube 11 traveling along the drum 13, as indicated by dotted lines in Figure 1, causing the sheared leading edge of the tube to fold upwardly along the creases thereof, to be folded into engagement with the tube by the folding roll 24.

Referring now to the glue spotters 21 extending across the drum 13 on opposite sides of the belt 20 in advance of the cutters 23, for spotting the top surface of the paper tube with glue adjacent the leading end thereof, to effect the gluing of the creased portions of the tube to the top surface thereof as the tube 11 passes under the folding roll 24 and the creased portions of the tube are folded into engagement with the top of the tube, the glue spotters 21 are shown as being in the form of a plurality of tubes spaced across the drum 13. Each glue spotter tube 21 leads downwardly from a fitting 183 toward the surface of the drum 13. Each fitting 183 is secured to the end of a sleeve 185. The sleeves 185 are mounted on and extend through a transverse rocking tube 184, forming a reservoir for glue. The tube 184 is suitably journaled in opposite side frame members 31 and 32 for rocking movement with respect thereto and the glue therein is transmitted to the glue spotters 21 through ports 186 leading to the interiors of said sleeves (Figure 14). A piston 187 is slidably mounted within the tube 185 for reciprocable movement with respect thereto to form in effect a pump to supply glue to the tube 21 during each pressure stroke of said piston. The piston 187 is pivotally connected at its outer end to an arm 188, extending diametrically from a collar 189 secured to a rock shaft 190 and rocked thereby.

The shaft 190 is journaled in the side frame members 31 and 32 and extends outwardly of the side frame member 32. A drive collar 191 is secured to the outer end portion of the shaft 190 projecting from the side frame member 32. A yoke 193 extends radially from the periphery of the collar 191 and is threaded in said collar. A nut 194 is provided to lock the yoke 193 in position on the collar 191. A roller 195, carried by the yoke 193 on a pin 196 rides along a cam 197 on the opposite end of the shaft 136 from the helical gear 135. The cam 197 has a peak 199 engaging the roller 195 during each revolution of the shaft 136, to move the pistons 187 inwardly of the sleeves 185 and eject glue through the tubes 21. Compression springs 205 encircling the pistons 187, bias said pistons in their outwardly extended positions and bias the roller 195 in engagement with the face of the cam 197.

The cam 197 is shown as being driven from the shaft 136 through a radially extending pin 201, extending through an angularly disposed slot 202 formed in the end portion of the shaft 136, and opening thereinto. The pin 201 has a rectangular slide 203 pivoted on its inner end, slidably engaging an angularly disposed slot 204 in a sleeve 205, mounted within the hollow interior of the shaft 36, for rotation therewith. The sleeve 205 is moved axially of the hollow interior of the shaft 136 by means of an adjusting screw 206 threaded within a bracket 207 extending outwardly from the side frame member 31 and upwardly therefrom along the outer end of the shaft 136, and having a hand wheel 209 pinned or otherwise secured to the end thereof. A lock nut 211 is provided to lock the threaded rod in position along the bracket 207. The threaded rod extends inwardly along the sleeve 205 beyond the inner end thereof and has a collar 212 suitably secured to the inner end thereof as by a snap ring 213. The opposite end of the sleeve 205 is abutted by a collar 215 pinned or otherwise secured to the threaded rod 206. A pin 216 is also mounted in the shaft 136 in diametrically opposed relation with respect to the pin 201 and has a block 217 mounted on the inner end thereof riding in a longitudinally extending groove 219 formed on the opposite side of the sleeve 205 from the angularly disposed slot 204 to hold the sleeve 205 from rotation as it is axially moved along the hollow interior of the shaft 136, to vary the angular position of the cam 197 with respect to the drive shaft 136 therefor.

It should here be understood that since the glue spotters 21 are always a fixed distance in advance of the cutters 23, and since the drum 13 is always traveling at a constant rate of speed, that the glue spotters are always in position to spot the upper surface of the paper tube with glue regardless of the length of the garment bag being made and that the adjustment of the cam 195 is only necessary to take care of the varying speeds of the shaft 136 where the speed of the shaft is changed for different lengths of garment bags.

It may be seen from the foregoing that a simplified and improved garment bag making machine has been provided in which the garment bag is formed from a flattened tube of paper or fabric in a series of slitting operations, a creasing operation simultaneously with the final slitting operation and a folding operation of the creased portion of the tube subsequently to an operation of spotting the top surface of the tube with glue.

It may further be seen that the garment bag is made while moving along the traveling periphery of a drum and that the length of the bag may readily be changed by varying the angular relation of the cutters with respect to each other and the speed of travel of the cutters with respect to the peripheral speed of the drum.

It will be understood that various modifications and variations in the present invention may be effected without departing from the spirit and scope of the novel concepts thereof.

I claim as my invention:

1. In a machine for making garment bags and the like, a rotatable drum, a motor, means driven by said motor for driving said drum at a constant rate of speed, a draw roll cooperating with said drum for drawing a flattened tube of paper onto said drum, a lip cutter spaced circumferentially along said drum in advance of said draw roll and cooperating with said drum to cut an arcuate slit in said tube through both surfaces thereof, a cut-off and creasing cutter spaced circumferentially along said drum from said lip cutter and cooperating with said drum to cut-off and crease the advance end portion of the bag, a folding roll spaced circumferentially along said drum from said cut-off and creasing cutter and cooperating with said drum for folding over the creased portion of the tube, and means driven by said means for driving said drum for driving said cutters at the same linear velocities to effect the slitting, cut-off and creasing operations, along the tube in cooperation with said drum.

2. In a garment bag making machine, a drum, a motor for driving said drum, a lip cutter cooperating with said drum to cut an arcuate lip on a flattened tube of paper traveling along said drum, a cut-off cutter spaced about said drum and cooperating therewith for transversely slitting the tube on opposite sides of the arcuate slit formed therein, common drive means for said cutters driven by said motor, and means for varying the time of cooperation of said cutters with said drum to effect a change in length of the garment bag.

3. In a garment bag making machine, a rotatable drum, a lip cutter cooperating with said drum to cut a lip in both sides of a flattened tube traveling about said drum, a cut-off cutter spaced in advance of said lip cutter and cooperating with said drum for transversely slitting the tube on opposite sides of the lip thereof to form individual tubes of equal length, a motor, means driven by said motor for driving said drum at a constant rate of speed, comprising a gear having driving connection with said drum, common drive means for said cutters, and means for varying the time of cooperation of said cutters with said drum for varying the length of the completed bag.

4. In a garment bag making machine, a rotatable drum the periphery of which forms a working surface, means for driving said drum at a constant rate of speed, a lip cutter operable against said drum to cut an arcuate slit to both sides of a tube traveling about said drum, a cut-off cutter spaced about said drum in advance of said lip cutter and adapted to cut-off the tube and intersect the arcuate lip thereof, common drive means for said cutters for driving said cutters at the same rates of speed and at slower peripheral speeds and the speed of rotation of said drum, said cutters reacting directly against said drum during the cutting operation, and the drive thereto being yieldable to accommodate said drum to pick up said cutters to travel at peripheral speed thereof.

5. In a garment bag making machine, a rotatable drum, the periphery of which forms a conveying and working surface, a motor, means driven by said motor for driving said drum at a constant speed including a gear coaxial with the axis of rotation of said drum and having driving connection therewith, a lip cutter reacting against said drum for cutting an arcuate slit in both sides of a flat tube traveling about said drum, a cut-off cutter spaced in advance of said lip cutter and cutting off the tube in lines intersecting the arcuate slit cut by said lip cutter, a geared drive connection from said drive gear for driving said cutters at the same rates of speed, means for varying the angular relation between said lip cutter and said cut-off cutter, other means accommodating the speed of travel of said cutters to be changed with respect to the peripheral speed of said drum in accordance with the angular relation of said cutters with respect to each other, to form bags of selected lengths.

6. In a garment bag making machine, a rotatable drum, the periphery of which forms a conveying and working surface, a rotatable lip cutter cooperating with the working surface of said drum for slitting opposite sides of a flattened tube traveling about said drum, laterally spaced cut-off cutters cooperating with the working surface of said drum spaced in advance of said lip cutter and adapted to cut off the tube on opposite sides of said arcuate slit in intersecting relation with respect thereto, said cut-off cutters having creasers thereon for creasing the tube at angles receding from opposite advance ends of said arcuate lip, to cause the advance ends of the tube on opposite sides of said arcuate lip to lift upwardly with respect to the drum, glue spotters driven from the means for driving said cutters, for spotting the top surface of the tube with glue, and a folding roll folding the creased advance end portions of the tube backwardly onto the glue spotted portion thereof.

7. In a garment bag making machine, a rotatable drum, the periphery of which forms a conveying and working surface, a rotatable lip cutter cooperating with the working surface of said drum for slitting opposite sides of a flattened tube traveling about said drum, laterally spaced cut-off cutters cooperating with the working surface of said drum spaced in advance of said lip cutter and adapted to cut off the tube on opposite sides of said arcuate slit in intersecting relation with respect thereto, said cut-off cutters having creasers thereon for creasing the tube at angles receding from opposite advance ends of said arcuate lip, to cause the advance ends of the tube on opposite sides of said arcuate lip to lift upwardly with respect to the drum, glue spotters driven from the means for driving said cutters, for spotting the top surface of the tube with glue, and a conveyor belt traveling at the speed of said drum and turning about said folding roll and engaging the periphery of said drum in advance of said lip cutter and traveling between said cut-off cutters for retaining the flat tube to the drum during the working operations thereon.

8. In a garment bag making machine, a rotatable drum, the periphery of which forms a conveying and working surface, a rotatable lip cutter cooperating with the working surface of said drum for slitting opposite sides of a flattened tube traveling about said drum, laterally spaced cut-off cutters cooperating with the working surface of said drum spaced in advance of said lip cutter and adapted to cut off the tube on opposite sides of said arcuate slit in intersecting relation with respect thereto, said cut-off cutters having creasers thereon for creasing the tube at angles receding from opposite advance ends of said arcuate lip, to cause the advance ends of the tube on opposite sides of said arcuate lip to lift upwardly with respect to the drum, glue spotters driven from the means for driving said cutters, for spotting the top surface of the tube with glue, and means for varying the length of the completed garment bags comprising means for changing the angular relationship of said cutters with respect to each other and other means accommodating the speed of travel of said cutters with respect to the peripheral speed of said drum to be varied.

9. In an apparatus of the class described, a traveling work surface, a conveyor movable along said surface for retaining a flattened tube thereto, cutters spaced along said surface, creasers on the advance of said cutters, said cutters working against said surface and effecting successive slitting and severing operations on a flattened tube traveling therealong, and means spaced in advance of said cutters for spotting the traveling tube with glue comprising a plurality of ejector tubes spaced across said surface, individual pistons reciprocably operable to eject glue from said ejector tubes, means for driving said cutters at the same peripheral speeds, and cam means driven by said drive means for said cutters for operating said pistons to effect the spotting of glue on the upper face of the flattened slit tube traveling along said work surface.

10. In an apparatus of the class described, a traveling work surface having resilient strips extending across the face thereof and spaced apart at intervals equal to selected lengths of completed garment bags, means driving said traveling work surface to travel at a constant speed, rotatable cutters spaced along said traveling work surface and reacting against said resilient strips, and means retaining a flattened tube of paper to said surface comprising pivoted retainer fingers spaced along opposite edges of said surface and biased to extend over said surface, a draw roll for drawing at flat tube onto said surface, means spaced from said draw roll effecting the removal of a completed garment bag from said surface, and other means spaced along said surface rearwardly of said draw roll and said removing means for moving said retaining fingers outwardly and upwardly with respect to said surface prior to the drawing of a flattened tube thereon and prior to the discharge of a completed garment bag therefrom.

11. In an apparatus of the class described, a traveling work surface having resilient strips extending across the face thereof and spaced apart at intervals equal to selected lengths of completed garment bags, means driving said traveling work surface to travel at a constant speed, rotatable cutters spaced along said traveling work surface and reacting against said resilient strips, and means retaining a flattened tube of paper to said surface comprising retaining fingers mounted on said surface and spaced along opposite sides thereof, spring means biasing said retaining fingers to extend over said surface in juxtaposition with respect thereto, and cam means spaced along said surface at the entering and discharge ends thereof for elevating and pivoting said fingers away from said surface to accommodate the drawing of material thereon and the withdrawal of material therefrom.

12. In a garment bag making machine, a frame, a drum rotatably mounted on said frame and having resilient strips extending across the face thereof and spaced about said frame at intervals in increments of length of the completed garment bags, a motor, means driven by said motor for rotatably driving said drum at a constant speed of rotation, a lip cutter rotatably mounted on said frame for rotation about an axis parallel to the axis of rotation of said drum for engaging an associated resilient strip and effecting a cutting operation thereon, a cut-off cutter rotatably mounted on said frame for rotation about an axis parallel to the axis of rotation of said lip cutter and spaced in advance thereof and engageable with an associated resilient strip for performing a cutting operation thereon, means for driving said cutters at the same speeds of rotation, and means for varying the angular relation of said cutters with respect to each other and accommodating the speeds of rotation of said cutters to be varied with respect to the speed of rotation of said drum to effect a selection in length of the completed garment bags.

References Cited in the file of this patent

UNITED STATES PATENTS

| | | |
|---|---|---|
| 1,176,163 | Potdevin | Mar. 21, 1916 |
| 1,571,983 | Weber | Feb. 9, 1926 |
| 1,742,174 | Coty et al. | Dec. 31, 1929 |
| 1,838,704 | Potdevin | Dec. 29, 1931 |
| 2,179,464 | Avery | Nov. 7, 1939 |
| 2,264,550 | Potdevin | Dec. 2, 1941 |
| 2,518,960 | Tollison | Aug. 15, 1950 |